United States Patent [19]

Ishimori et al.

[11] Patent Number: 4,674,287
[45] Date of Patent: Jun. 23, 1987

[54] RUNNING APPARATUS FOR AN AGRICULTURAL VEHICLE

[75] Inventors: Shoso Ishimori; Seiichi Ishiizumi; Mikio Ishida; Hiroshi Itatani, all of Sakai, Japan

[73] Assignee: Kubota, Ltd., Osaka, Japan

[21] Appl. No.: 658,937

[22] Filed: Oct. 9, 1984

[30] Foreign Application Priority Data

Dec. 1, 1983 [JP] Japan .......................... 58-186177[U]

[51] Int. Cl.[4] .......................................... F15B 1/053
[52] U.S. Cl. ...................................... 60/416; 60/378; 60/469
[58] Field of Search .............. 60/413, 414, 464, 468, 60/469, 416, 378

[56] References Cited

U.S. PATENT DOCUMENTS

| 3,306,040 | 2/1967 | Summerlin | 60/416 |
| 3,748,859 | 7/1973 | Pruvot | 60/464 |
| 3,896,705 | 7/1975 | Patton | 60/468 |

FOREIGN PATENT DOCUMENTS

| 0164201 | 12/1981 | Japan | 60/416 |
| 0714060 | 2/1980 | U.S.S.R. | 60/468 |

Primary Examiner—Margaret A. Focarino
Attorney, Agent, or Firm—Jordan and Hamburg

[57] ABSTRACT

A running apparatus for an agricultural vehicle comprising an oil stepless change speed device, an oil circuit for an oil pump and an oil motor to actuate the oil stepless change speed device and an accumulator. The accumulator accumulates a surplus of an output pressure of the oil pump when the pressure is higher than a predetermined value and discharges the accumulated pressure when the output pressure of the oil pump is lower than the predetermined value.

5 Claims, 8 Drawing Figures

RUNNING APPARATUS FOR AN AGRICULTURAL VEHICLE

BACKGROUND OF THE INVENTION

This invention relates to a running apparatus for an agricultural vehicle in which an oil stepless change speed device is provided.

The above-mentioned agricultural vehicle normally has the following drawbacks or troubles. Namely, when pulses occur in the output of an oil pump consisting of the stepless change speed device due to an oil leakage or other causes under such a state that a driving load of the running apparatus is relatively small and driving speeds thereof are relatively fast and that the vehicle runs on a flat road at high speeds, variation of rotation speeds of an oil motor becomes extremely great due to the pulsing output thereof and then brings about great driving noises and gives the vehicle body a compulsive vibration which is discomfortable to a driver.

SUMMARY OF THE INVENTION

The first object of this invention is to improve a running apparatus for an agricultural vehicle such that speeds of an oil motor are not easily varied even if an oil pump produces a pulsing output.

The characteristic construction of this invention for achieving the first object is that a running apparatus for an agricultural vehicle comprises an oil stepless change speed device consisting of an oil pump and an oil motor, oil paths for connecting the oil pump and the oil motor, and an accumulator disposed in parallel with the oil motor between the paths, characterised in that the accumulator is so constructed as to accumulate therein a surplus of an output pressure of the oil pump when the output pressure is greater than a predetermined value and as to discharge an accumulated pressure when the output pressure of the oil pump is smaller than the predetermined value.

Namely, by providing the accumulator in the above-mentioned state, when the output pressure of the pump becomes greater than a predetermined value, the accumulator absorbs and accumulates a surplus pressure of the output pressure and controls the output pressure for the motor to be reduced into a value lower than that of the output pressure of the pump, and when the output pressure is smaller than the predetermined value, the accumulator discharges the accumulated pressure so as to control the pressure for the motor to be increased to a value greater than that of the output pressure of the pump.

Therefore, even if pulses occur in the output of the pump, the oil pressure to the motor may be kept substantially at a predetermined value so as to make rotation speeds of the motor constant to the utmost, so that it becomes possible to drive the vehicle comfortably by preventing noises and compulsive vibrations to the vehicle body due to such a pulsing output of the pump.

The second object of this invention is to obtain the above-mentioned advantages by only providing the accumulator with a single piston.

To achieve the second object, the running apparatus for the agricultural vehicle according to this invention comprises the accumulator which comprises a piston disposed reciprocally slidably, a pair of oil pressure chambers for the piston, each being connected to a pair of the oil paths and arranged separately at each end of the piston, and an accumulating spring or springs arranged to urge the piston to return to a neutral position.

Namely, since a pair of the oil pressure chambers for the piston are connected respectively to a pair of the oil paths and arranged separately at each end of the piston and then the accumulating spring or springs are arranged to urge the piston to return to a neutral position, the spring or springs are deformed flexibly by the oil pressure acting on an end of the piston when forward running and the spring or springs are deformed flexibly by the oil pressure acting on the other end of the piston when rearward running, and therefore accumulation and discharge of the oil pressure may be carried out in both the forward and rearward running by providing only such a single piston.

Therefore, it is not necessary to provide a changing means to thereby eliminate trouble of provision thereof in comparison with such a case that it is necessary to connect an accumulator having a piston only on the side of the supplying path to the motor with respect to a pair of the paths. Thus, it may driven comfortably in any of forward and rearward runnings. This running apparatus has been obtained simple in construction and operation.

Other advantages of this invention will be apparent from the following description.

BRIEF DESCRIPTION OF THE DRAWINGS

The drawings show an embodiment of a running apparatus for an agricultural vehicle in which.

DETAILED DESCRIPTION OF THE PREFERRED EMBODIMENTS

Figure 1:
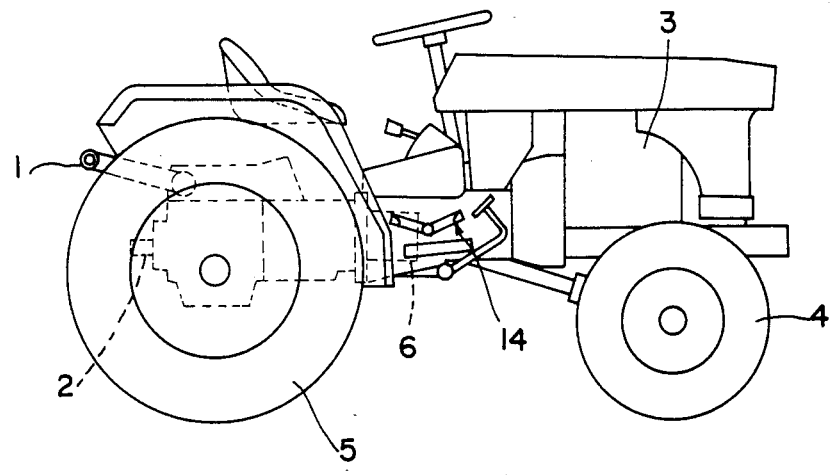
FIG. 1 is a side elevation of an agricultural tractor.

As shown in FIG. 1, an agricultural tractor is constructed such that a lift arm 1 which is swingable up and down and liftably connected to any type of working implements such as a rotary cultivating device (not shown), and a power take-off shaft 2 for transmitting a power to the connected working implement, are disposed at a rear portion of a self-propelled vehicle body having a running device of wheel type.

Figure 2:
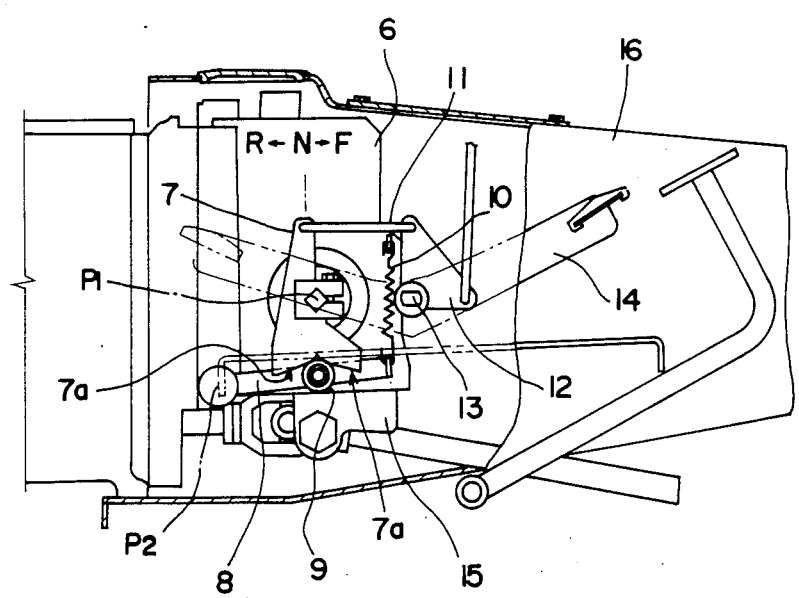
FIG. 2 is a side view of a mount section of an oil stepless change speed device.

In a drive line from an engine 3 to front wheels 4 and rear wheels 5, there is provided an oil stepless change speed device 6 which is changeable from neutral to forward and to rearward. As shown in FIG. 2, a change speed operating pedal 14 which is operatively connected by means of a swingable connecting member 12 and a rotary shaft 13, to an operating arm 7 swingable about an axis P1 of the change speed device 6, is swingably attached to a transmission case 16 which comprises a tractor body frame. A roller 9 is swingably attached to the change speed device 6 via a swing support arm 8 to be swingable about an axis P2. The roller 9 is urged to contact with a V-shaped cam surface 7a of the lower end of the operating arm 7 by means of a spring 10 so that the operating arm 7 and the change speed pedal 14 may be urged to return to a neutral position N. By stepping the pedal 14 on the side of forward or rearward of the tractor, the operating arm 7 is swung to the forward F or the rearward R and as the pedal 14 is stepped more deeply, the operating arm 7 is close to the side of high speed. Namely, it is so constructed that the change speed device 6 is operated by the pedal 14 so as to carry out operations of changing forward and rearward runnings, speeds and stopping of the tractor.

Figure 3:
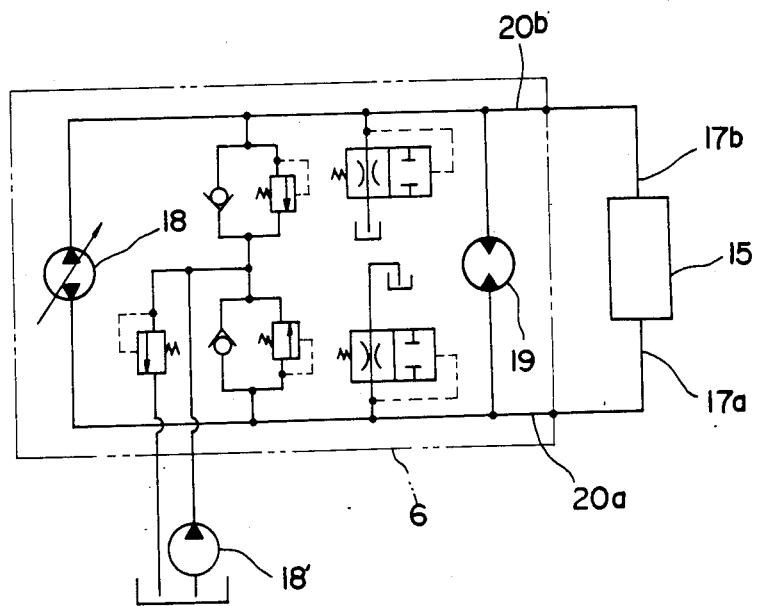
FIG. 3 is an oil circuit.

As shown in FIG. 2, an accumulator 15 is attached to the lower portion of the change speed device 6. As shown in FIG. 3, the accumulator 15 is connected to a pair of oil paths 20a, 20b for an oil pump 18 as an element of the change speed device 6 and an oil motor 19 via a pair of suction and discharge oil paths 17a, 17b formed with the accumulator 15, so as to control variations of rotation speeds of the motor 19 due to pulsing outputs of the pump 18 even if pulsing occurs in the outputs of the pump 18. Namely, the accumulator 15 is constructed such that when the output pressure of the pump 18 is greater than a predetermined value a surplus pressure over the predetermined value of the output pressure is absorbed and accumulated in the accumulator and controls the oil pressure acting on the motor to be reduced to a value lower than the output pressure of the pump. Further, the accumulator 15 is also constructed such that when the output pressure of the pump is smaller than a predetermined value the accumulator discharges an accumulated pressure and controls the oil pressure acting on the motor to be increased to a value higher than the output of the pump. A charge pump 18' supplies oil to the connecting paths 20a, 20b in such a state that the pressure of the pump 18 is compensated.

Figure 4:
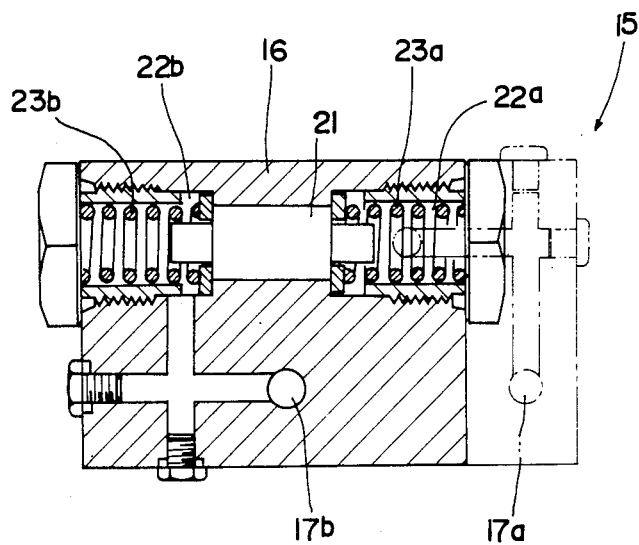
FIGS. 4 and 5 are sectional views of an accumulator.
Figure 5:
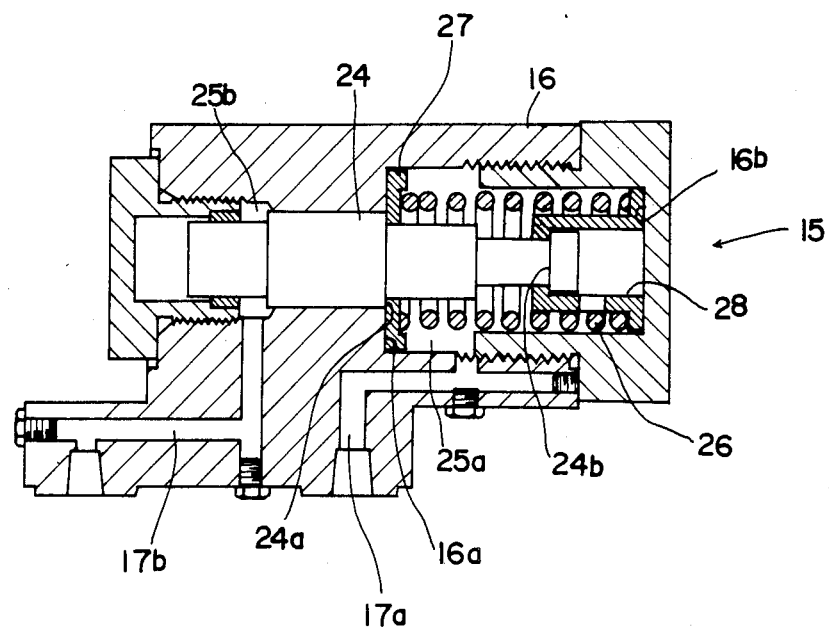

The accumulator 15 is constructed as shown in FIG. 4 or FIG. 5.

Namely, as shown in FIG. 4, a single piston 21 is housed in an accumulator case 16 to slide reciprocatingly, and first and second oil chambers 22a, 22b for the piston 21 are provided therein. The first oil chamber 22a is connected to the connecting path 20a via the oil path 17a in the accumulator case 16 and the other second oil chamber 22b is connected to the other connecting path 20b via the path 17b in the accumulator case 16, these thus being arranged separately adjacent each end of the piston 21 in such a state that these urge the piston 21 to return to a neutral position in cooperation with each other. Namely, when forward running, an oil flows into the first oil chamber 22a and the piston 21 is pushed to slide towards the second oil chamber 22b so that the spring 23b may be compressed. When rearward running, an oil flows into the second oil chamber 22b and pushes the piston towards the first oil chamber 22a so that the other spring 23a may be compressed.

As shown in FIG. 5, a single piston 24 is housed in an accumulator case 16 to slide reciprocatingly, and first and second oil chambers 25a, 25b for the piston 24 are provided therein. The oil chamber 25a is connected to the connecting path 20a via the path 17a in the accumulator case 16 and the other chamber 25b is connected to the other connecting path 20b via the oil path 17b in the accumulator case 16, these chambers being separately arranged adjacent each end of the piston 24. A single compression spring 26 is housed in the first oil chamber 25a. An end portion of the spring 26 is supported by a side surface 24a of an intermediate portion of the piston 24 and a oil chamber interior wall 16a of the accumulator case 16 via a first spring receiver 27 which is slidably fitted to the piston 24. The other end portion of the spring 26 is supported by an end surface 24b of the piston 24 of an oil chamber interior wall 16b of the case 16 via a second spring receiver 28 which is slidably fitted to the piston 24 so that the spring 26 may urge the piston 24 to return to a neutral position where the side surface 24a of the intermediate portion and the oil chamber interior wall 16a make substantially a flat plane. Namely, in the case of forward running, a pressure oil flows into the first oil chamber 25a and the piston 24 is slid towards the second oil chamber 25b, and compresses the spring 26 via the end surface 24b and the second spring receiver 28 so as to accumulate a power therewith. Further, when rearward running, an oil flows into the second oil chamber 25b and the piston 24 is slid towards the first oil chamber 25a and then compresses the spring 26 via the intermediate surface 24a and the first spring receiver 27 so as to accumulate a power therewith.

Figure 6:
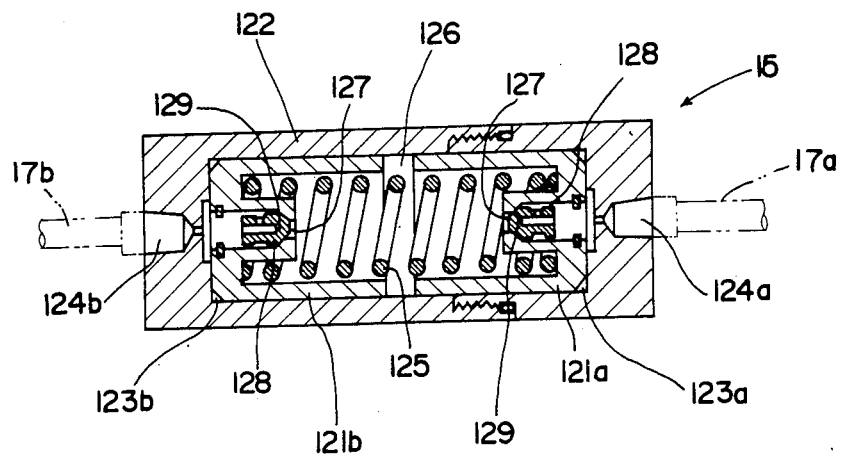
FIG. 6 is a sectional view of another embodiment of an accumulator.

Another aspect of the accumulator 15 is as shown in FIG. 6. Two pistons 121a and 121b are housed slidably in an accumulator case 122. An oil chamber 123a for forward running is formed with the accumulator case 122 adjacent one end of the piston 121a in such a state that the oil chamber is in communication with an inlet or outlet port 124a. An oil chamber 123b for rearward running is formed with the accumulator case 122 adjacent one end of the other piston 121b in such a state that the oil chamber is in communication with an inlet or outlet port 124b. A compression spring 125 is interposed between the two pistons 121a and 121b. Each of the two pistons 121a and 121b has a spring housing space 126 and a connection path 127 to the oil chamber 123a or 123b, and a valve 128 for the connection path 127 is housed slidably in each of the pistons 121a and 121b. The valve 128 of the piston 121a or 121b in an accumulating position is maintained in a closed position in contact with a valve seat 129 by means of an oil pressure in the oil chamber 123a or 123b. On the contrary, to enable a spring compression action for the piston 121a or 121b, the valve 128 of the piston 121b or 121a in a discharging position is operated into an open state remote from a valve seat 129 by means of a pressing action of the piston 121b or 121a caused by the oil stayed in the spring housing space 126 into which an oil leaks and flows from the oil chamber 123a or 123b through between the piston 121a or 121b and the accumulator case 122. The leaked oil in the spring housing space 126 flows into the oil chamber 123b or 123a through the connection path 127 in order to return same to either of the connecting oil paths 20a or 20b (in FIG. 3) which has a lower oil pressure than the other. In other words, the leaked oil from the oil chamber 123a or 123b is returned to the change speed device 6 by means of the path 17a and 17b for connecting the accumulator 15 and the change speed device 6, and by utilizing an accumulating function of the accumulator 15.

Figure 7:
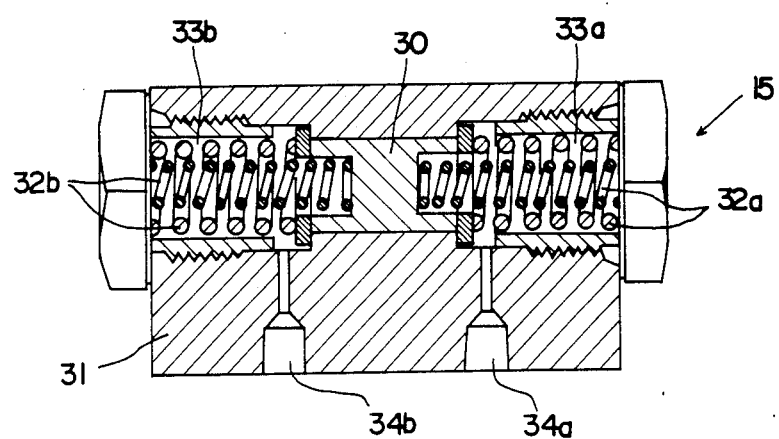
FIG. 7 is a sectional view of a further embodiment of an accumulator.

A further aspect of the accumulator 15 is shown in FIG. 7. A single piston 30 is slidably housed in an accumulator case 31, and two of four compression springs 32a, 33a, 32b and 33b are separately arranged on each side of the piston 30 so as to urge the piston 30 to return to a neutral position. An oil chamber 33a for forward running is formed with the accumulator case 31 adjacent one end of the piston 30 to be in communication with an inlet or an outlet port 34a. An oil chamber 33b for rearward running is formed adjacent the other end of the piston 30 to be in communication with an inlet or an outlet port 34b.

Figure 8:
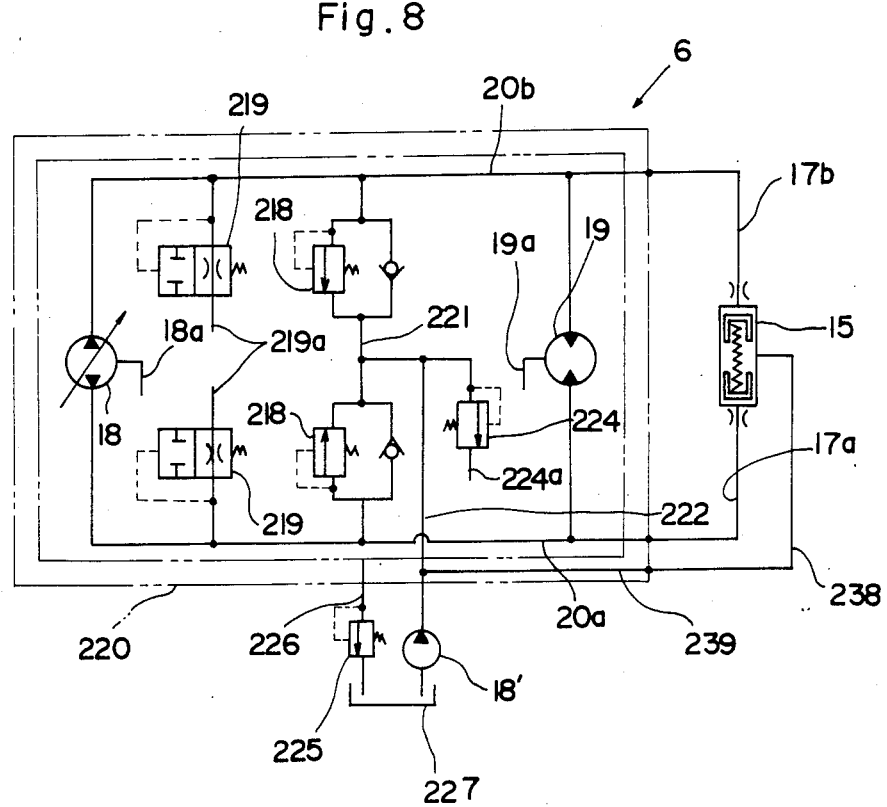
FIG. 8 is a circuit for another embodiment of a change speed device.

FIG. 8 shows another aspect of the stepless change speed device 6. A relief valve 218 and a neutral valve 219 are housed in a change speed device casing 220 to be a unit. The relief valve 218 prevents breakage of the oil path 20a or 20b by escaping an oil pressure from the path 20a or 20b to the path 20a or 20b which is a return path from the oil motor 19 to the oil pump 18, when pressures in the oil pump 18, the oil motor 19, the connecting oil paths 20a and 20b for the oil pump 18 and the oil motor 19, becomes higher than a predetermined value. The neutral valve 219 functions to stop the oil motor 19 by escaping the oil from the oil pump 18 out of the connecting oil paths 20a and 20b when an output pressure of the oil pump 18 becomes lower than a predetermined valve. A charge oil path 222 is connected to a relief oil path 221 in which the relief valve 218 is provided, so that an oil from a charge pump 18' may be charged to the connecting oil paths 20a and 20b via the relief oil path 221. A drain port 18a for the oil pump 18, a drain port 19a for the oil motor 19, a discharge oil port 224a of the relief valve 224 to the charge oil path 222, and a discharge oil port 219a of the neutral valve 219 are opened respectively in the change speed device casing 220, so that a leaked oil from the oil pump 18 and the oil motor 19, a surplus oil from the charge pump 18' and an escaping oil from the connecting oil paths 20a and 20b due to the neutral valve 219, may be discharged respectively into the change speed device casing 220. Further, it is constructed such that the discharged oil gathered in the casing 220 returns to a tank 227 via a relief valve 225 for controlling an oil leakage of the oil pump 18 or the oil motor 19, and a drain oil path 226.

What is claimed is:

1. A running apparatus for an agricultural vehicle comprising:
    a hydraulic stepless change speed device including a hydraulic pump, a hydraulic motor, and a looped line connected to the pump and motor so that when the pump is operated, fluid passes through the line to actuate the motor;
    means hydraulically connected to the looped line for feeding and discharging said fluid to the looped line to maintain pressure in the line substantially constantly, and
    accumulator means hydraulically connected to the looped line parallel to said hydraulic motor, said accumulator means comprising
    a casing, first and second fluid chambers defined in said casing and respectively connected to said looped line, a piston means chamber defined in said casing to communicate with said first and second fluid chambers, a piston means slidably situated in said piston means chamber, and a single spring means arranged in the casing to urge said piston means to a neutral position, wherein said accumulator means absorbs pressure pulsations produced in said looped line by elasticity of said single spring means so that the motor is operable free from the pulsations.

2. The apparatus of claim 1, wherein the piston means comprises a middle portion projecting into the first fluid chamber and an end portion projecting into the first fluid chamber, and wherein said accumulator means further includes a first spring receiver slidably mounted on the middle portion of the piston means projecting into the first fluid chamber and a second spring receiver having a tubular portion containing the end portion of the piston means projecting into the first fluid chamber, said single spring means being arranged between the first and second spring receivers.

3. The apparatus of claim 2, wherein the first fluid chamber comprises a first inner end wall and a second inner end wall, the middle portion of the piston means comprises a first radial surface and the end portion of the piston means comprises a second radial surface, and wherein said first spring receiver engages the first radial surface of the middle portion of the piston means and the first inner end wall of the first fluid chamber, and said second spring receiver engages the second radial surface of the end portion of the piston means and the second inner end wall of the first fluid chamber.

4. The apparatus of claim 1, wherein the piston means comprises a first tubular piston portion and a second tubular piston portion defining a space therebetween and therein, said single spring means being fitted in the space between and inside of said first and second tubular piston portions, and wherein said first tubular piston portion and an end wall of said casing define said first fluid chamber therebetween and said second tubular piston portion and another end wall of said casing define said second fluid chamber therebetween.

5. The apparatus of claim 4, wherein said first tubular piston portion includes a first connection path intercommunicating the space between said tubular piston portions and said first fluid chamber and a first valve means for opening and closing said first connection path, and said second tubular piston portion includes a second connection path intercommunicating the space between said tubular piston portions and said second fluid chamber and a second valve means for opening and closing said second connection path.

* * * * *